United States Patent Office 3,237,508
Patented Mar. 1, 1966

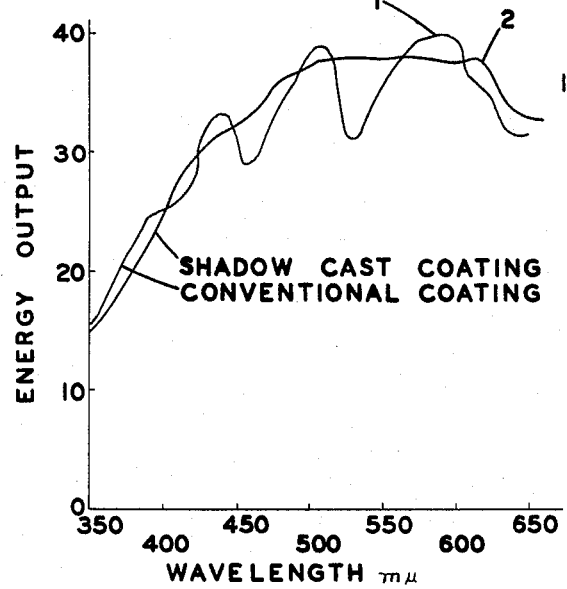
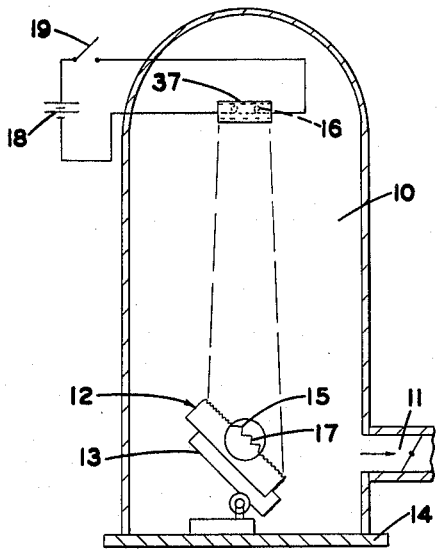
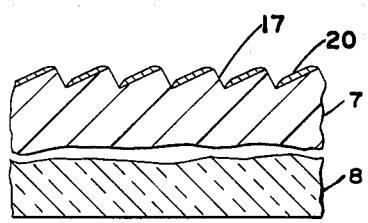
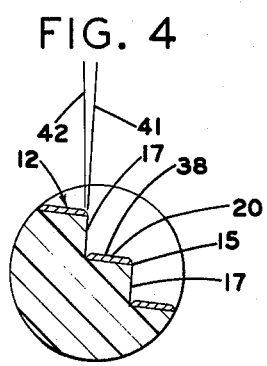
JOHN D. KELLER
ROBERT J. MELTZER
INVENTORS

3,237,508
REFLECTING DIFFRACTION GRATING FOR
MINIMIZING ANOMALIES
John D. Keller, Greece, and Robert J. Meltzer, Irondequoit, N.Y., assignors to Bausch & Lomb Incorporated,
Rochester, N.Y., a corporation of New York
Filed Apr. 12, 1962, Ser. No. 186,959
5 Claims. (Cl. 88—1)

This invention relates to a diffraction grating and more particularly to a replica grating having a single face of the groove surfaces coated with reflecting material in a manner to minimize anomalies in the energy distribution produced by the grating.

A grating anomaly may be defined as an abrupt change in the intensity in the spectrum of a white light source. (Journal of Optical Society of America, 42, 1952, p. 269.) This condition is called anomalous because it is not predicted by the Fraunhofer theory of diffraction. These variations are probably caused by some resonant interaction between the light diffracted from the different groove surfaces. The diffraction field from the faces on the back side of the groove is summed with the diffracted field from the reflecting face of the groove causing variations in the energy output from the grating. The problem is in reducing the reflectivity of the back face of the groove. This may be accomplished by removing the reflective coat from a replica grating and then recoating with a coating so that only the blaze or reflecting face of the groove receives the coating, then a reduction in the intensities of the anomalies has been achieved.

It is an object of this invention to reduce anomalies in a diffraction grating through replication.

It is another object of this invention to replicate a grating and recoat the groove faces so that one face reflects the light and the second face absorbs light.

It is a further object of this invention to shadow cast a replica grating to reduce reflection of the back face of the grooves of a diffraction grating.

The objects of this invention are accomplished by recoating only the reflecting groove surfaces on a replica grating providing an absorbing surface on the non-reflecting groove surfaces.

Further objects and features of the invention will be apparent from the following detailed description of the grating forming the specific embodiment thereof when read in conjunction with the drawings, in which:

FIG. 1 is a graph illustrating the energy output of a conventional diffraction grating in contrast to the energy output of a shadow cast grating of the type described.

FIG. 2 illustrates a diffraction grating formed by the shadow casting process.

FIG. 3 illustrates a method of shadow casting.

FIG. 4 is an enlarged view of the grating in shadow cast position.

Referring to the drawings, FIG. 1 illustrates the energy output of a conventional grating. The sharp discontinuities in the energy versus wavelength function are clearly illustrated. The line 1 of the graph illustrates a conventional grating where the anomalies are clearly shown. The line 2 illustrates the output of a shadow cast diffraction grating. It can be seen that the anomalies, present in the conventional replica grating, are substantially eliminated by shadow casting.

Referring to FIGS. 3 and 4 a vacuum chamber having an evaporating means is illustrated. The chamber 10 may be evacuated through the conduit 11 to place a substantial vacuum within the chamber 10. The grating 12 is then positioned on the pivotal carriage 13 which is mounted on the base 14. The angle of positioning the grating 12 depends on the blaze angle of the grating 12.

The grating 12 is positioned at such an angle that a slight shadow is cast by the edge 15 of the groove 38. Referring to FIG. 4 the line 42 indicates the line of projecting metal vapor while line 41 is in the same plane as the face 17 of groove 38. In this position evaporating aluminum projected from the heating element 16 is not permitted to coat the back face 17 of the groove 38 on the grating. The aluminum sleeve 37 is placed on the heating element 16 and is evaporated when the source of electrical energy 18 is connected through the switch 19. The evaporating aluminum 37 is projected in a linear manner as indicated and the reflecting face 20 receives a coating while the back face 17 is prevented from receiving the coating. The back face 17 may be formed of a light absorbing material to essentially eliminate any reflection of light transmitted through the face. The epoxy resin, the glass base, or any surface on the resin or base may be made of a light absorbing material to essentially eliminate reflection. An example of this might be on the binding surface between the resin 7 and the glass base 8.

As illustrated in FIG. 2 the back face 17 is shown uncoated subsequent to the removal from the chamber. The reflecting face 20 has received a coating of aluminum.

In the process for reducing anomalies, the reflecting coat such as aluminum is removed from the base of the replica grating. Through a process of evaporation under low pressure a second coating may be applied to the ruled surface of the base. By placing the grating at a certain angle, only the reflecting face of the grooves is coated while the back face which is not in line with the projecting vapor from the evaporating source is not coated. In effect the back sides of the groove are in a shadow relative to the evaporating source of reflective coating material. The ruled surface of the base forms the support for the second coating. The shadow casting substantially eliminates any coating on the back face of the groove. In this manner anomalies are substantially reduced in a process known as shadow casting in replication wherein the finished surface simulates the base surface on the replica grating.

While the invention is thus described, it is not wished to be limited to the precise details described as changes may be readily made without departing from the spirit of the invention.

What is claimed is:

1. A replica reflecting diffraction grating comprising a rigid base, a ruled surface on said base including a plurality of grooves for diffracting light, a flat reflecting face and a flat back face forming each of said grooves, a reflecting coat covering only said reflecting face for reflecting light incident thereon, a light transmitting material forming the back face for eliminating the reflection of light from said back face and preventing the light from interfering with the light reflected from the reflecting face to thereby provide more uniform energy distribution from said grating.

2. A replica reflecting diffraction grating comprising, a light pervious supporting means, a ruled surface on said supporting means, at least two planar faces forming each of the grooves on said ruled surface, a reflective coat on the first of said faces of said grooves for reflecting light directed thereon, a light absorbing medium of said supporting means forming the second of said faces of said grooves for absorbing light falling on said second face thereby providing a grating having energy output with a minimum of anomalies.

3. A replica reflecting diffraction grating comprising, supporting means, a ruled surface including a plurality of grooves formed on said supporting means, a planar reflecting face and a planar back face defining each of said grooves on said ruled surface, a reflective coat forming an external reflective facet simulating the reflecting face of the coat supporting means for reflecting light, a light absorbing medium forming the back face of said grooves for absorbing light thereby absorbing reflected interfering light from said reflective facet to reduce anomalies in the energy output of said diffraction grating.

4. A replica reflecting diffraction grating comprising, a supporting means, a ruled surface on said supporting means formed by a plurality of grooves including, a planar reflecting face and a planar absorbing back face forming each of said grooves, a reflective coat on the reflecting face of each of said grooves simulating the base of said coat formed by said supporting means for reflecting light incident thereon, an absorbing medium forming the back face of said groove for absorbing diffused reflected light from said reflecting surface thereby reducing anomalies in the energy output of said diffraction grating.

5. A reflective diffraction grating comprising a light pervious supporting means, a ruled surface on said supporting means, a planar reflective face positioned at a predetermined blaze angle and a back face positioned at a predetermined back angle forming each of the grooves on said ruled surface, a reflective coating on the reflective faces of said grooves for reflecting light directed thereon, an uncoated back face formed by said light pervious supported means absorbing light for suppressing any diffractive effect from the back face of said groove to thereby provide a grating having an energy output with a minimum of anomalies.

References Cited by the Examiner

UNITED STATES PATENTS

| | | | |
|---|---|---|---|
| 2,143,723 | 1/1939 | Walker et al. | 117—107 |
| 2,311,400 | 2/1943 | Landell | 88—77 |
| 2,731,366 | 1/1956 | Weinrich | 117—107 |
| 2,977,847 | 4/1961 | Meyer-Arendt | 88—1 X |
| 3,045,531 | 7/1962 | Prescott | 88—14 |
| 3,045,532 | 7/1962 | Staunton | 88—14 |
| 3,046,839 | 7/1962 | Bird et al. | 88—65 |
| 3,134,021 | 5/1964 | Ploke. | |

JEWELL H. PEDERSEN, *Primary Examiner.*

JOHN K. CORBIN, *Examiner.*